(12) United States Patent
Bathula

(10) Patent No.: US 7,632,397 B2
(45) Date of Patent: Dec. 15, 2009

(54) INTEGRATED PORTABLE WATER PURIFIER

(75) Inventor: Gangadhar Bathula, 5512 Laredo Ct., #K, Richmond, VA (US) 23228

(73) Assignee: Gangadhar Bathula, Glen Allen, VA (US)

( * ) Notice: Subject to any disclaimer, the term of this patent is extended or adjusted under 35 U.S.C. 154(b) by 442 days.

(21) Appl. No.: 11/664,366

(22) PCT Filed: Oct. 21, 2004

(86) PCT No.: PCT/IN2004/000332

§ 371 (c)(1),
(2), (4) Date: Mar. 27, 2007

(87) PCT Pub. No.: WO2006/043283

PCT Pub. Date: Apr. 27, 2006

(65) Prior Publication Data

US 2009/0200215 A1    Aug. 13, 2009

(51) Int. Cl.
*C02F 1/32* (2006.01)

(52) U.S. Cl. ......................... 210/86; 210/96.1; 210/104; 210/244; 210/260; 210/282; 210/295; 210/474; 222/189.05

(58) Field of Classification Search .................. 210/86, 210/96.1, 104, 244, 260, 282, 295, 474; 222/189.06
See application file for complete search history.

(56) References Cited

U.S. PATENT DOCUMENTS

| 6,110,424 A * | 8/2000 | Maiden et al. ................ 422/24 |
| 6,953,523 B2 * | 10/2005 | Vandenbelt et al. ........... 210/85 |
| 2007/0209984 A1 * | 9/2007 | Lev et al. .................... 210/143 |

* cited by examiner

*Primary Examiner*—Terry K Cecil

(57) ABSTRACT

The present invention relates to an integrated portable water purifier for purifying water, by filtration through adsorption media to remove harmful chemicals followed by ultraviolet treatment to disinfect the water. The water purifier effectively removes the contaminants found in drinking water. The integrated portable water purifier includes a water chamber (1) for receiving water to be purified and a treated water chamber (2) for receiving treated water through a filter cartridge (20). The water purifier is provided with a microprocessor based controller (6) for controlling the operation of the purification system. A UV lamp (8) is provided in the treated water chamber (2) for microbiological treatment of the filtered water in the treated water chamber (2) and a sensor (7) for sensing the conductivity of the treated water and the level of the water in the treated water chamber (2). A power source (18) is provided for supplying power to the system.

14 Claims, 6 Drawing Sheets

INTEGRATED PORTABLE WATER PURIFIER

THE FIELD OF THE INVENTION

Figure 1:
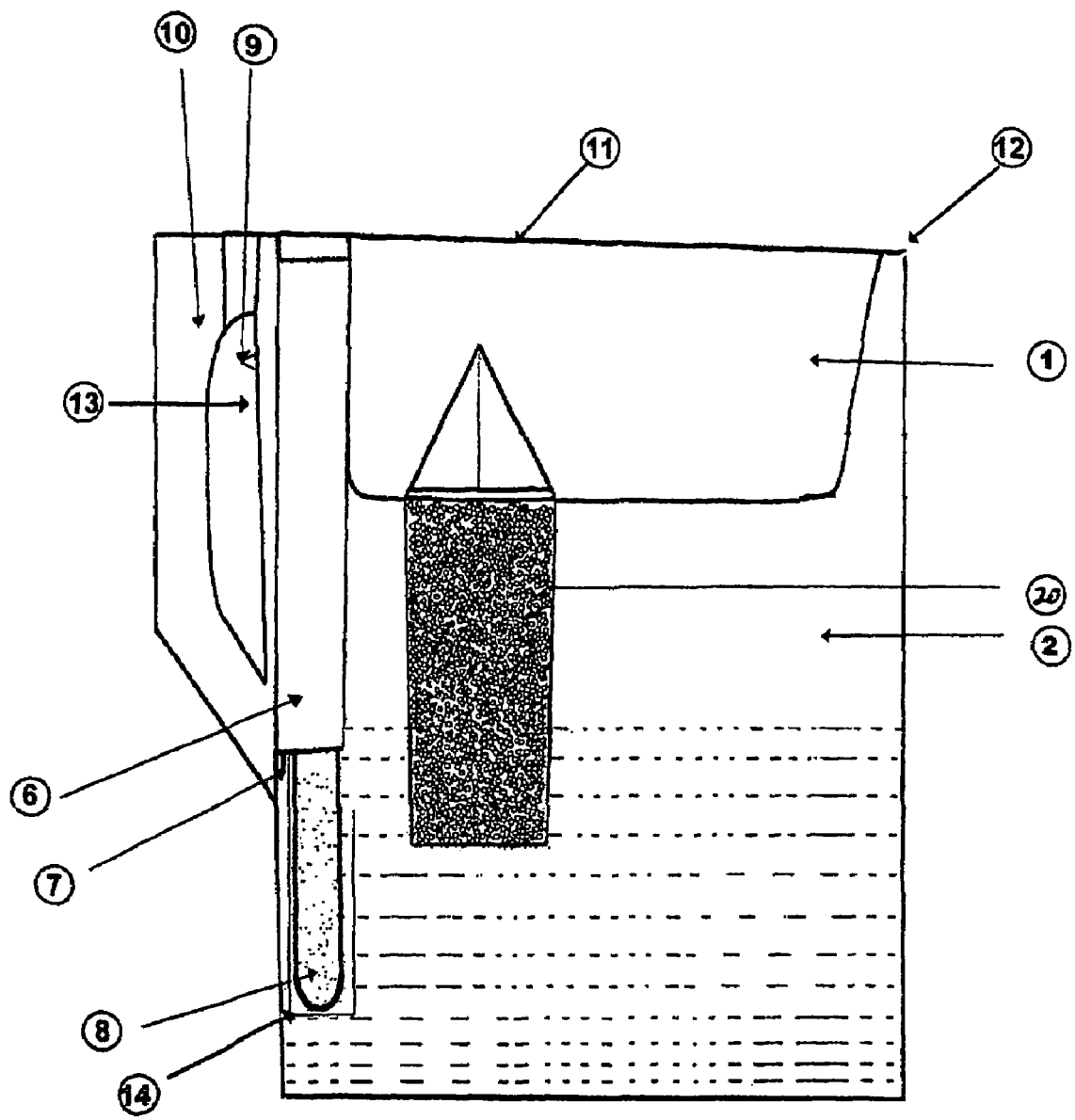

The present invention relates to an integrated portable water purifier. The water purifier uses advanced microprocessor based technology. The present invention also relates to a method for purifying water, by filtration through adsorption media to remove harmful chemicals followed by ultraviolet treatment to disinfect the water.

BACKGROUND OF THE INVENTION

Various residential water purification systems are known to people for many years. Many self-contained water treatment systems use at least one harmful chemical for disinfecting water. In most of the conventional water purification systems, the water is treated for microbiological content by leaching chemicals such as chlorine, iodine or silver salts into the treated water. In some cases there may not be any treatment process for microbiological content as these filters are simple dust or sediment removal filters.

Most of the known water purification systems lack in proper measurement or indication of water quality to the end user. Also many of the water purification systems are designed to purify the water only once for biological content. As it is well known that the treatment of the water for biological content is performed either by addition of halogens such as chlorine and iodine or salts of precious metals such as silver. These chemicals leach and add to the drinking water which when consumed can result in health problems. Also, these chemicals are active in water for limited time and can protect the water only for a short duration. It is scientifically proved that there is always a possibility for microbial re-growth if there is no periodic microbiological treatment of water.

Conventional water treatment systems with UV lamps are bulky and are fixed in line with water piping. These in line UV disinfections system are not portable. Also these systems are energy intensive, as they need continuous power requirement at high intensity irrespective of varying water flows. Therefore, there is a need for a water purifier, which is compact, portable and energy non-intensive with desired end result.

The drinking water supplied to homes or commercial institutions comes in contact with many water body surfaces and travel miles of pipe length before it gets into the drinking water glass. The recent study indicates that the water leaving at treatment plant is not the same quality as the water at its final destination. The water in pipeline gets contaminated by the scales and films deposited in pipeline. The water at the point of use is contaminated through many sources, which are not visible to the naked eye. Even the water treated at the entry of a system may also get contaminated before it is ready for drinking. Therefore, there is a need for an instantaneous water purification system for producing water free of chemical impurities and microbes while keeping the water always fresh, before the water gets consumed. It is also important that the water purifier should be insoluble and do not leach any chemicals such as precious metals salts as these are hazardous to health if the limits are exceeded.

The object of the present invention is to provide a water purifier, which effectively removes the contaminants found in drinking water and overcomes many disadvantages stated above. Another object of the present invention is to provide a water purifier, which is portable. A further object of the present invention is to provide the user with a displaying means to indicate the water purity based on predefine adsorption residence time. The required residence time can be adjusted and programmed to meet the specific contamination present in the water and the adsorbent combination can be used in cartridge.

SUMMARY OF THE INVENTION

The present invention provides a water purification system, which is portable and capable of producing odorless fresh water free of chemical impurities and microorganisms. Accordingly, the present invention provides an integrated portable water purifier, comprising a raw water chamber for receiving water to be purified, a treated water chamber for receiving treated water through a filter cartridge for filtering the raw water from the raw water chamber to the treated water chamber, a microprocessor based controller for controlling the operation of the water purifier, a UV lamp is provided in the treated water chamber for microbiological treatment of the filtered water in the treated water chamber, a sensor is provided for sensing the conductivity of the treated water and the level of the water in the treated water chamber and a power source for supplying power to the UV lamp and the controller.

The water purifier according to the present invention treats water in batches. The filter cartridge used in the purifier removes the chemical impurities. The post filter purification for microbiological treatment is done with the help of UV lamp, which exposes the water in the treated water chamber to UV rays.

The water purifier in accordance with the invention is an integrated system and works based on predefined program of a microprocessor based controller. The water purifier may be powered by rechargeable battery. Once the batteries are charged, the system is portable and convenient to carry and keep at any desired location.

In another aspect of the invention, the water purifier is provided with a conductivity sensor to measure the conductivity of the treated water. The sensor also provides information on the level of the water in the treated water chamber. The output from the conductivity sensor is fed to a programmed microprocessor to indicate the level of the water and the quality of the water in the treated water chamber.

The water purifier is provided with a UV lamp for destroying the microbes by altering the reproducing cells DNA sequence. The UV lamp works in conjunction with a conductivity sensor and a timer to destroy the microbial growth. The UV lamp operation control is incorporated in program logic of the microprocessor. The UV lamp and its operation sequence is designed and programmed to optimize the energy utilization while meeting sterilization needs.

The water purifier according to the present invention is provided with a microprocessor, which controls and executes the desired functions of the water purifier through microprocessor based program. The microprocessor based program is designed to measure various inputs and take designated actions to purify and to indicate the water quality after the treatment of water. The microprocessor based controller is in a completely water sealed case to avoid any water leakage into the controller. Necessary '0' rings and sealing arrangement is provided to prevent the water from external sources into the controller. The controller is connected to a reset button, recharge socket, displaying means and a UV lamp with ballast system. The controller is enclosed inside a water tight sealed case.

Figure 2:
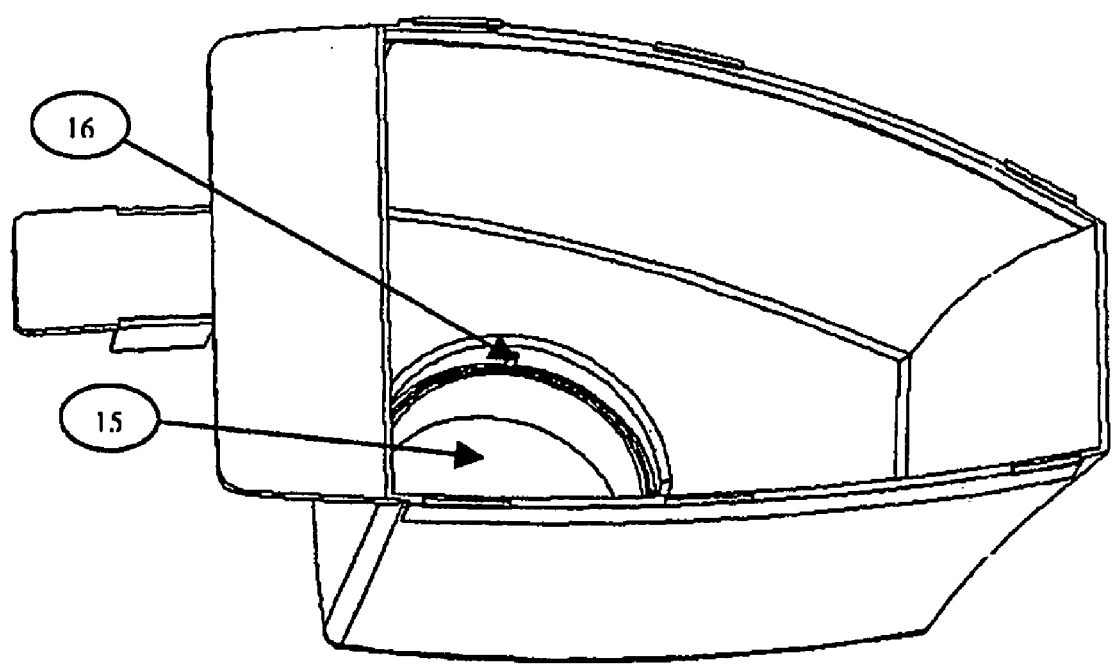
Figure 3:
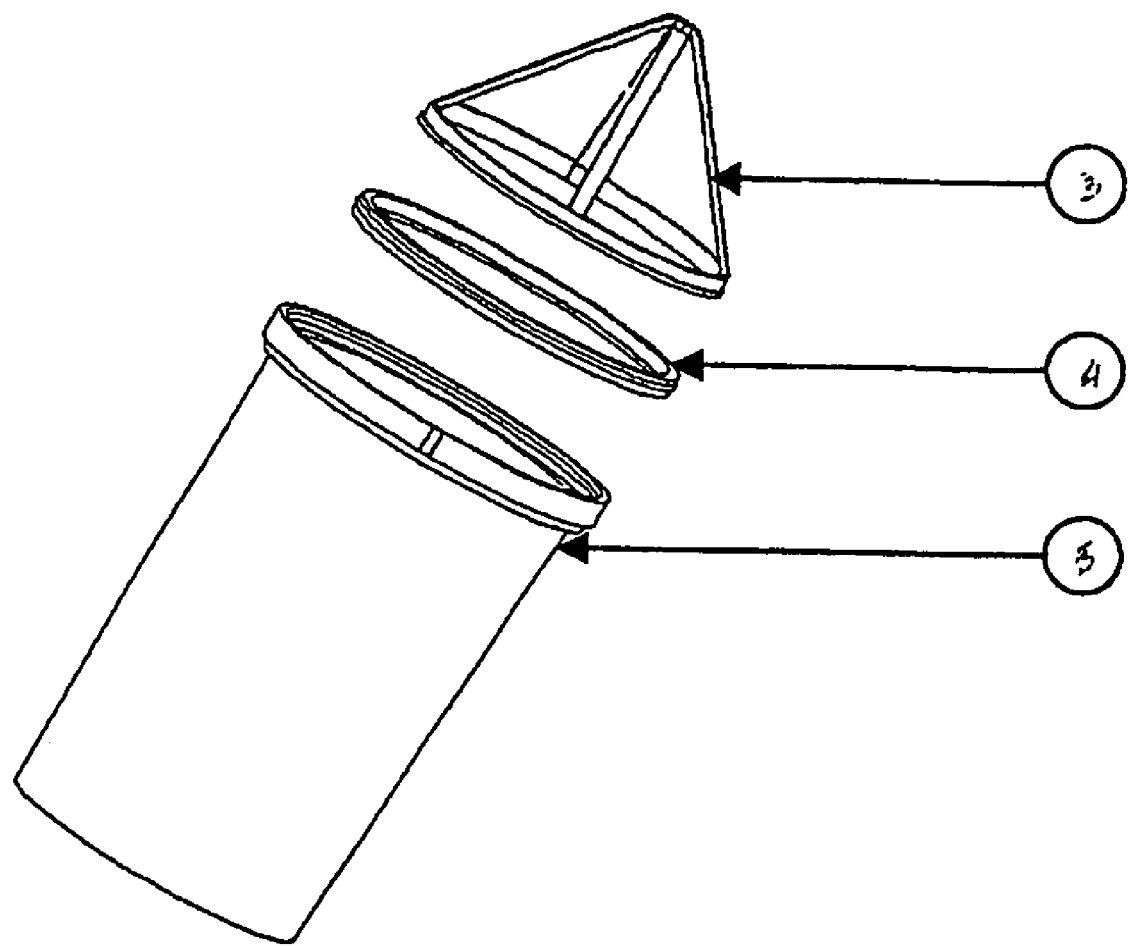
Figure 4:
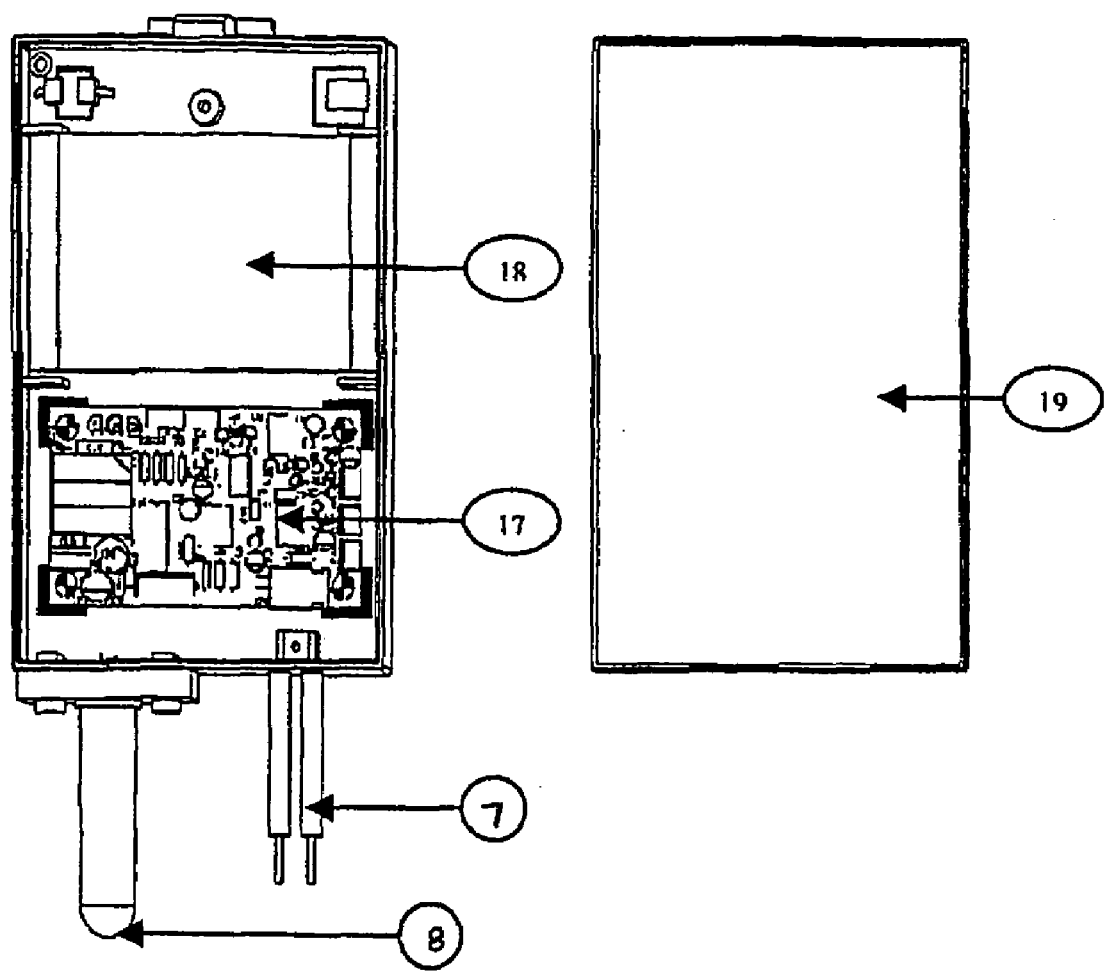
Figure 5:
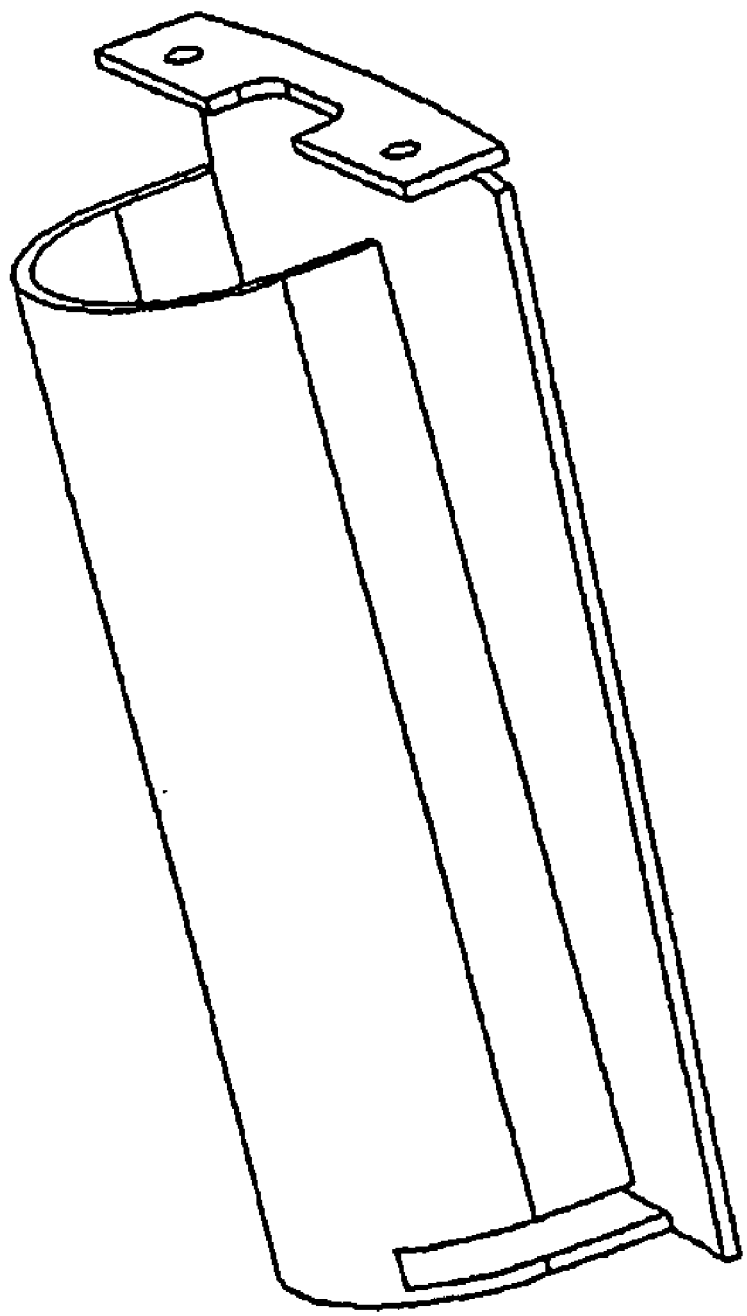
Figure 6:
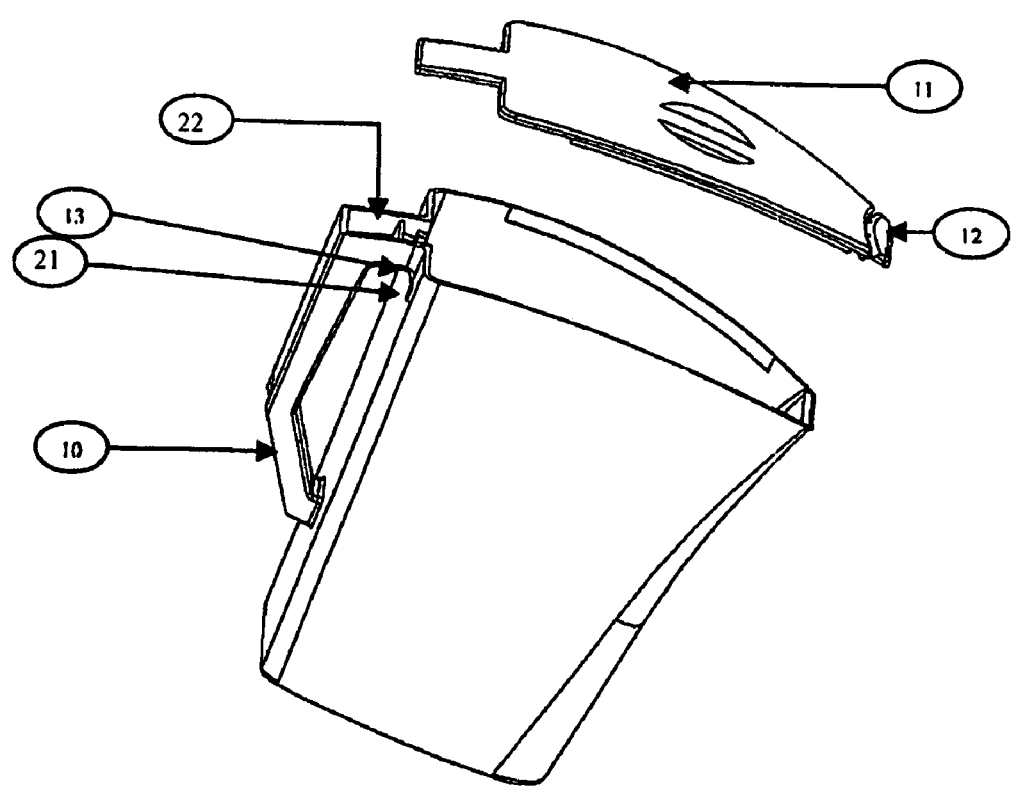

The invention will now be described with reference to the accompanying drawings in which, FIG. 1 shows the water purifier according to the invention, FIG. 2 shows the raw water chamber of the purifier, FIG. 3 shows an exploded view of the filter cartridge, FIG. 4 shows microprocessor based controller and its cover, FIG. 5 shows the UV lamp cover, FIG. 6 shows the external view of the water purifier with a top lid and a flap.

DETAILED DESCRIPTION WITH REFERENCE TO THE ACCOMPANYING DRAWINGS

FIG. 1 shows the integrated portable water purifier with a raw water chamber (1) for receiving water to be purified and a treated water chamber (2) for receiving treated water through a filter cartridge (20).

Untreated water is filled into the raw water chamber (1). The raw water chamber (1) has a bottom opening (15) for fitting the filter cartridge (20) as shown in FIG. 2. The opening (15) in the raw water chamber (2) is provided with a locking mechanism (16) for preventing the filter cartridge (20) from rotational and vertical movement. The raw water chamber (1) is covered with a lid (11). The water gets filtered into the treated water chamber (2) through the filter cartridge (20) by gravity.

FIG. 3 shows the filter cartridge (20) with a conical upper portion (3) provided with a mesh cover for removing dust and suspended particles. A flat middle portion (4), which is a fine mesh filter located just below the conical upper portion (3) for removing additional suspended and dust particles. A lower portion (5) is having an insoluble granular purifier placed inside a conical vessel for filtering the water.

The water to be purified from the raw water chamber (1) comes in contact with high surface area of conical mesh filter (3) where particulate and other suspended material present in the water are separated. The filter cartridge middle portion (4) just below the conical filter (3) further prevents the suspended particulate material into the treated water chamber. Also, the middle filter mesh (4) holds filter media of the cartridge and works as a top seal. The bottom portion of the filter (5) cartridge has an adsorption cum absorption media for purifying the water for undesired chemicals at molecular level. The bottom portion of the filter cartridge is perforated and has a mesh to hold the adsorbent in the cartridge. The water from the middle portion comes in contact with the adsorbent of the bottom portion of the filter cartridge where the contaminants are separated by physical and chemical adsorption process. Also, since the filter cartridge is suspended into treated water chamber (2) the water is constantly being purified. Once the filter cartridge is saturated with contaminants, it is replaced. The life and usage is also monitored and controlled by the microprocessor based controller (6).

The adsorption filter media is selected from insoluble granular purifying agents such as activated carbon, activated aluminum, synthetic zeolites, silica gel, metal oxides such as zirconium or titanium oxide, and strong base anion resin, and mixtures thereof. This filter media used reduces the impurities such as toxic organic chemicals, chlorine, fluoride, heavy metals such as lead, mercury, chromium, arsenic etc. The filter media is nontoxic, insoluble and chemically and biologically stable. The filter media used has a very high kinetic and equilibrium affinity towards various contaminants. In view of its stability, the media is reused until the surface area and pore volume is saturated with contaminants.

Through the filter cartridge (20), the water flows from the raw water chamber (1) and gets collected in the treated water chamber (2). Once the filtered water, in the treated water chamber reaches a certain level, a sensor (7) generates signal for irradiating with germicidal UV light by a UV lamp (8) to sterilize the water. After sterilizing the water, and based on feedback received from sensor (7) the displaying means will display the quality of the water in the treated water chamber. The conductivity cum level sensor (7) is located at required height from the bottom of the treated water chamber. The sensor (7) is located at a height proportional to the minimum volume of the water present in the treated water chamber. The sensor (7) is connected to the microprocessor based controller. The UV lamp (8) is located just below controller touching the water present in the treated water chamber. The lamp is lighted based on the presence of water and preprogrammed time intervals.

FIG. 5 shows a safety cover (14), which surrounds enclosing the UV lamp (8) to protect the user from getting exposed to any traces of UV rays. The lamp cover (14) is provided to give maximum protection and effective utilization of UV rays. The lamp cover (14) is preferably made of stainless steel with required curvature to maximize the UV ray utilization within the water. The lamp cover (14) is configured to effectively utilize the germicidal rays while protecting the user from exposure to UV light. The UV lamp cover (14) is fixed tightly to a lamp holder.

The microprocessor based controller (6) as shown in FIG. 4 is connected to a printed circuit board (17), battery (18), UV lamp (8) and sensor (7). The controller is provided with a box cover (19). The microprocessor is preprogrammed and configured to meet the water purification functionality. It takes the input from sensor and provides the output to displaying means. In addition, the controller will also monitor the voltage level of rechargeable battery and gives signal to the end user if the battery charge is low. The program logic is developed to handle all exceptions and errors during the normal function of the system.

A timer is provided to measure and count the life of the cartridge and to display to the end user for replacement of cartridge within the stipulated time. All the electronic components are integrated and housed on the printed circuit board (17). The printed circuit board (17), battery and UV lamp are made waterproof and housed within the controller in a suitable water sealed container.

Preferably a handle (10) may be provided to make the water purifier portable and handy. The handle helps in easy handling of the filter. FIG. 6 shows the water purifier with a flap (12) through which the treated water is poured out.

Two side holes have been provided to the container for providing a reset switch (13) and a re-charger socket (21). These are connected to the controller and access has been extended from main container through these two holes. If this main container is made of transparent material, the displaying means (9) connected to the controller will be visible to the user from the outside. The control box is hooked up from the handle top (22) and is extended into the main container.

It should be understood that the present invention is not limited to the preferred embodiments described above. However, alterations and modifications known to persons skilled in the art are within the scope and principles of this invention and the appended claims.

The invention claimed is:

1. An integrated portable water purifier, comprising a portable container having a raw water chamber (1) for receiving water to be purified, a treated water chamber (2) for receiving treated water and a filter cartridge (20) for filtering the raw water flowing by gravity from the raw water chamber (1) to the treated water chamber (2), a UV lamp (8) provided in the treated water chamber (2) for microbiological treatment of the filtered water in the treated water chamber (2), a conductivity sensor (7) provided in the treated water chamber and configured for sensing the quality of the treated water and the level of the water in the treated water chamber (2), a microprocessor based controller (6) configured for receiving an output from the conductivity sensor to indicate the quality and level of water in the treated water chamber and controlling the operation of the UV lamp in response thereto, and a power source for supplying power to the UV lamp and the controller.

2. The water purifier as claimed in claim 1, wherein said filter cartridge (20) is a semi conical cartridge filter.

3. The water purifier as claimed in claim 2, wherein said filter cartridge comprises a conical upper portion (3) with a mesh cover for removing dust and suspended particles, a flat middle portion (4) provided with a fine mesh filter located below the conical upper portion (3) for removing additional suspended and dust particles and a lower portion (5) containing an insoluble granular purifier placed in a conical vessel for filtering the granular substance.

4. The water purifier as claimed in claim 1, wherein said filter cartridge (20) is provided with a self sealing mechanism to avoid any leakage of untreated water from the raw water chamber into the treated water chamber.

5. The water purifier as claimed in claim 1, wherein said filter cartridge (20) is provided with a rotational locking mechanism (16) to avoid any rotation and tilting of the cartridge during usage.

6. The water purifier as claimed in claim 1, wherein the UV lamp (8) is provided with a steel plate (14) for user safety.

7. The water purifier as claimed in claim 6, wherein the steel plate is a polished steel plate for reflecting light.

8. The water purifier as claimed in claim 1, wherein the microprocessor-based controller is provided with a timer for monitoring the life of said filter cartridge (20).

9. The water purifier as claimed in claim 1, comprises a display (9) for indicating the water quality.

10. The water purifier as claimed in claim 1, wherein the UV lamp (8) is provided with ballast system for operating the lamp.

11. The water purifier as claimed in claim 1, wherein a lid (11) is provided in the raw water chamber for preventing water from spilling.

12. The water purifier as claimed in claim 1, wherein a flap (12) is provided on the treated water chamber for removing treated water.

13. The water purifier as claimed in claim 1, wherein a handle is provided for portability.

14. The water purifier as claimed in claim 1, wherein a reset switch (13) is provided in the microprocessor based controller.

* * * * *